United States Patent
Magarian et al.

(10) Patent No.: US 7,634,495 B2
(45) Date of Patent: Dec. 15, 2009

(54) SYSTEM OF MULTI-LEVEL DEFAULTS IN TRANSACTION ENTRIES

(75) Inventors: Kevin M. Magarian, Fargo, ND (US); Kimberly A. Nelson, Fargo, ND (US); Ronald H. Schulz, W. Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 11/124,503

(22) Filed: May 6, 2005

(65) Prior Publication Data

US 2006/0253412 A1    Nov. 9, 2006

(51) Int. Cl.
G06F 17/00   (2006.01)
G06F 15/16   (2006.01)

(52) U.S. Cl. .............. 707/102; 707/3; 707/4; 707/5; 707/104.1; 707/1

(58) Field of Classification Search .......... 707/100, 707/101, 102, 3, 4; 715/200
See application file for complete search history.

(56) References Cited

U.S. PATENT DOCUMENTS

| | | | | |
|---|---|---|---|---|
| 5,566,330 A | * | 10/1996 | Sheffield | 707/4 |
| 5,778,370 A | * | 7/1998 | Emerson | 707/100 |
| 5,809,497 A | * | 9/1998 | Freund et al. | 707/2 |
| 6,185,555 B1 | * | 2/2001 | Sprenger et al. | 707/3 |
| 6,557,011 B1 | * | 4/2003 | Sevitsky et al. | 707/104.1 |
| 6,651,217 B1 | * | 11/2003 | Kennedy et al. | 715/224 |
| 6,915,306 B1 | * | 7/2005 | Gong et al. | 707/102 |
| 6,934,715 B2 | * | 8/2005 | Kalmes et al. | 707/102 |
| 2004/0093562 A1 | * | 5/2004 | Diorio et al. | 715/513 |
| 2004/0205075 A1 | * | 10/2004 | LaTurner et al. | 707/100 |
| 2005/0262121 A1 | * | 11/2005 | Cesare et al. | 707/100 |
| 2006/0047847 A1 | * | 3/2006 | Saccocio | 709/235 |
| 2007/0022085 A1 | * | 1/2007 | Kulkarni | 707/1 |
| 2007/0179939 A1 | * | 8/2007 | O'Neil et al. | 707/4 |

* cited by examiner

Primary Examiner—Tony Mahmoudi
Assistant Examiner—Dennis Truong
(74) Attorney, Agent, or Firm—Joseph R. Kelly; Westman, Champlin & Kelly, P.A.

(57) ABSTRACT

A system for entering multi-level default data in defaultable fields of a new-data-entry entity based on data entered in multi-level controlling fields. A default-data entity provides selectable default data. A default-rule entity includes default rules that specify selections of the default data as a function of controlling data entered into the multilevel controlling fields. A processing unit executes the data-default rules and automatically enters default data. The system simplifies entry of transactions in a database such as a general ledger.

20 Claims, 6 Drawing Sheets

|  | DEFAULT-DATA TABLE 000000000034 | |
|---|---|---|
| DEFAULT-DATA KEY | DEFAULTABLE FIELD | DEFAULT DATA |
| 00001 | 10005 | SINGLE SHIPMENT |
| 00002 | 10005 | SHIP AS AVAILABLE |
| 00003 | 10005 | SHIP PER SCHEDULE.. |
| 00004 | 10005 | WAIT FOR SHIP INSTRUCTIONS |
| 00005 | 10005 | SHIP BEFORE.. |
| 00006 | 10005 | SHIP AFTER.. |
| 00007 | 10029 | POSTAL |
| 00008 | 10029 | TRUCK.. |
| 00009 | 10029 | AIR.. |
| 00010 | 10029 | CUSTOMER PICKUP |
| 00011 | 10029 | OTHER.. |
| 00012 | 10073 | CANADA |
| 00013 | 10073 | MEXICO |
| 00014 | 10073 | UNITED STATES |
| 00015 | 10073 | JAPAN |
| 00016 | 10073 | UNITED KINGDOM |

SYSTEM OF MULTI-LEVEL DEFAULTS IN TRANSACTION ENTRIES

BACKGROUND OF THE INVENTION

Various enterprise software packages such as Axapta, Navision and Great Plains Enterprise Resource Planning (ERP) applications are known. These applications combine financial management, customer relations management, supply chain management, human resource management or other database management applications in a single highly integrated enterprise application.

These enterprise software packages utilize a large number of stored database files (also called tables) that are part of a collection of historical information (also called a database) that is shared by the various management applications. These database files represent widely varying types of enterprise information and include data from transactions such as sales, purchase orders and bill payments, or reference tables such as currency exchange rates, employee records and customer profiles, as well as ledgers and other accounting tables. Data from a particular transaction is typically stored in multiple tables. Storing related information in multiple tables, rather than a single table, speeds up searches and enhances data integrity.

There are a large number of events in which users creates a new instance of a transaction in the course of conducting daily business activities. The user opens a data entry screen and enters new data into the data entry screen.

When the data entry screen or data table is initially displayed to the user, it is common practice for initial default values to be entered into some of the data fields after data is entered into a key field of the data entry screen. The default data represents historical data that is relatively stable. After data entry is complete, the completed new data entry is stored as an additional instance of a transaction in the database.

For example, when an order entry clerk enters a new order from a customer, after a customer number is entered in a key field, the data entry screen then displays default data such as billing address, shipping address, method of payment, method of shipment and other fixed historical data associated with the manually entered customer number.

These automatic displays of default data save time and help avoid data entry errors. In some fields associated with the key field, however, the default data is not automatically displayed because it is not a stable value, or is not completely determined based on the customer number. For example, a particular customer may not have a fixed shipping address, but may instead have multiple shipping addresses that depend on the name of the purchasing agent who is placing the order, the type of goods ordered and the season of the year. The default based only on a key field does not address this problem.

Manual data entry and manual data selection are time-consuming, costly and prone to errors. There is a desire to increase the efficiency and accuracy of new data entry by increasing the number of default entries for fields associated with the key field. However, the fact that data entered in the key field is not a complete basis for selecting a default value for these fields is a barrier to increasing the number of default entries.

A method is needed to ascertain and automatically enter default values for fields in which the default value depends on causes and conditions other than data entered in a key field.

SUMMARY OF THE INVENTION

A system is used in entering data into a database. The system comprises a new-data-entry entity that includes a plurality of multi-level controlling fields and a plurality of defaultable fields.

The system also comprises a default-data entity that includes selectable default data available for entry in the defaultable fields in the new-data-entry entity. The system also comprises a default-rule entity that includes default rules that specify selections of the default data as a function of controlling data entered into the multilevel controlling fields.

The system also comprises a processing unit that receives controlling data entries for the controlling fields. The processing unit executes the data-default rules associated with the controlling data entries the processing unit automatically enters default data into the defaultable fields as specified by the data-default rules.

Various kinds of data entry tasks are automated with multiple levels of default data entry. A defaultable field in a first default rule at a higher level can be a controlling field in a second default rule at a lower level. Lower level rules are preferably executed after higher level rules, and the user can override automatic default data with manual data entries.

BRIEF DESCRIPTION OF THE DRAWINGS

FIG. 5 illustrates a default-data entity.

DETAILED DESCRIPTION OF ILLUSTRATIVE EMBODIMENTS

Figure 1:
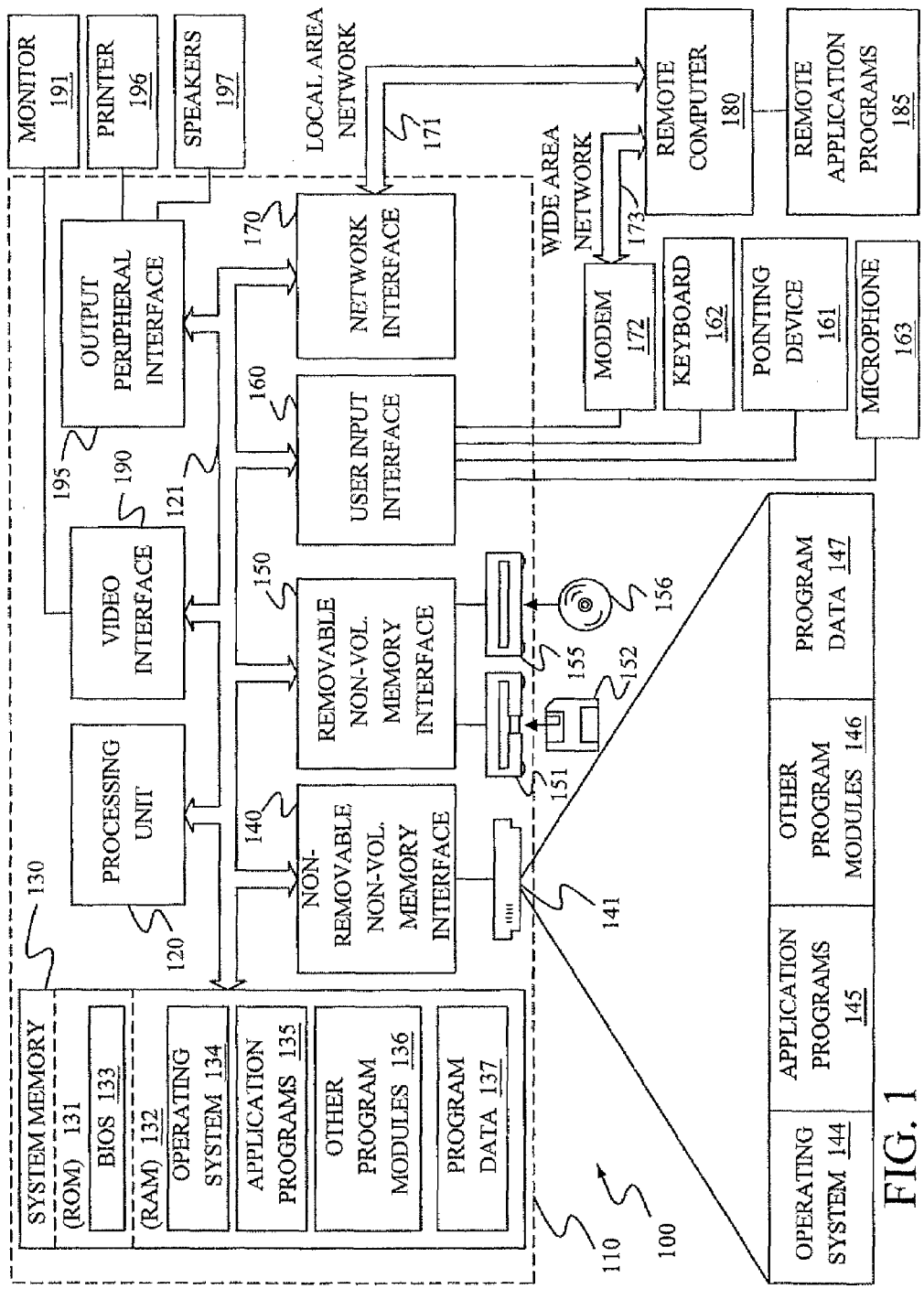
FIG. 1 is a block diagram of one computing environment in which the present invention may be practiced.

In the embodiments described below, an enterprise management system includes business management applications that transact against a database.

A system for automatically entering multiple levels of default data into a database is included. The system includes multiple new-data-entry entities. Each new-data-entry entity serves as a type of "blank form" for user data entry. A new-data-entry entity is displayed for a user to enter data in fields. The fields include a plurality of multi-level controlling fields and a plurality of defaultable fields.

The system also includes a default-data entity that stores selectable default data available for selection and entry in the defaultable fields. The system includes a default-rule entity that provides default rules that specify selections of the default data as a function of controlling data that the user has entered into the multilevel controlling fields.

A processing unit receives the controlling data from the user, and executes the data-default rules. Processing the data-default rules automatically enters default data into the defaultable fields. Data entry tasks are automated with multiple levels of default data entry. A defaultable field in a first default rule at a higher level can be a controlling field in a second default rule at a lower level in a hierarchy of data-default rules. Lower level rules are preferably executed after higher level rules, and the user can override automatic default data with manual data entries.

When the user has completed data entry for the transaction, the user saves the completed new-data-entry entity as a new-transaction entity. Typically, after a batch of new-transaction entities are created and corrected as needed, the user provides a command to distribute the stored data in the batch of new-transaction entities to database files that typically comprise ledger files that are part of a general ledger database.

Unless otherwise indicated by the context, the following definitions apply to this application:

The term "transaction" means a logical grouping of information.

The term "key data" means data, such as a number, that uniquely identifies a unique one member, out of a class of members, that is logically related to the transaction. In a sales transaction, the key data is typically a customer number. In a purchase transaction, the key data is typically a vendor number. In a personnel action transaction, the key data is typically an employee number. In a depreciation transaction, the key number is typically a capital equipment number of a particular item of capital equipment. In an engineering change order transaction, the key number is typically a model number of a product that is to be changed. In a maintenance work order transaction, the key number is typically a machine number which is being maintained.

The term "defaultable field" means a field for which default data is available.

The term "subkey data" means data that, when combined with key data, at least partially determines default data for a defaultable field. Subkey data is typically not unique to a particular member, taken from a group of members, associated with a transaction.

The term "controlling data", as used in this application, means key data, subkey data, or a combination of key data and subkey data.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

In the embodiments described below in connection with FIGS. 2-6, mention is made of an example of a transaction which is a sales order entry transaction in which a customer number is key data. It is understood that this example is merely illustrative, and that the system can be applied to the entire range of known types of transactions.

Figure 2:
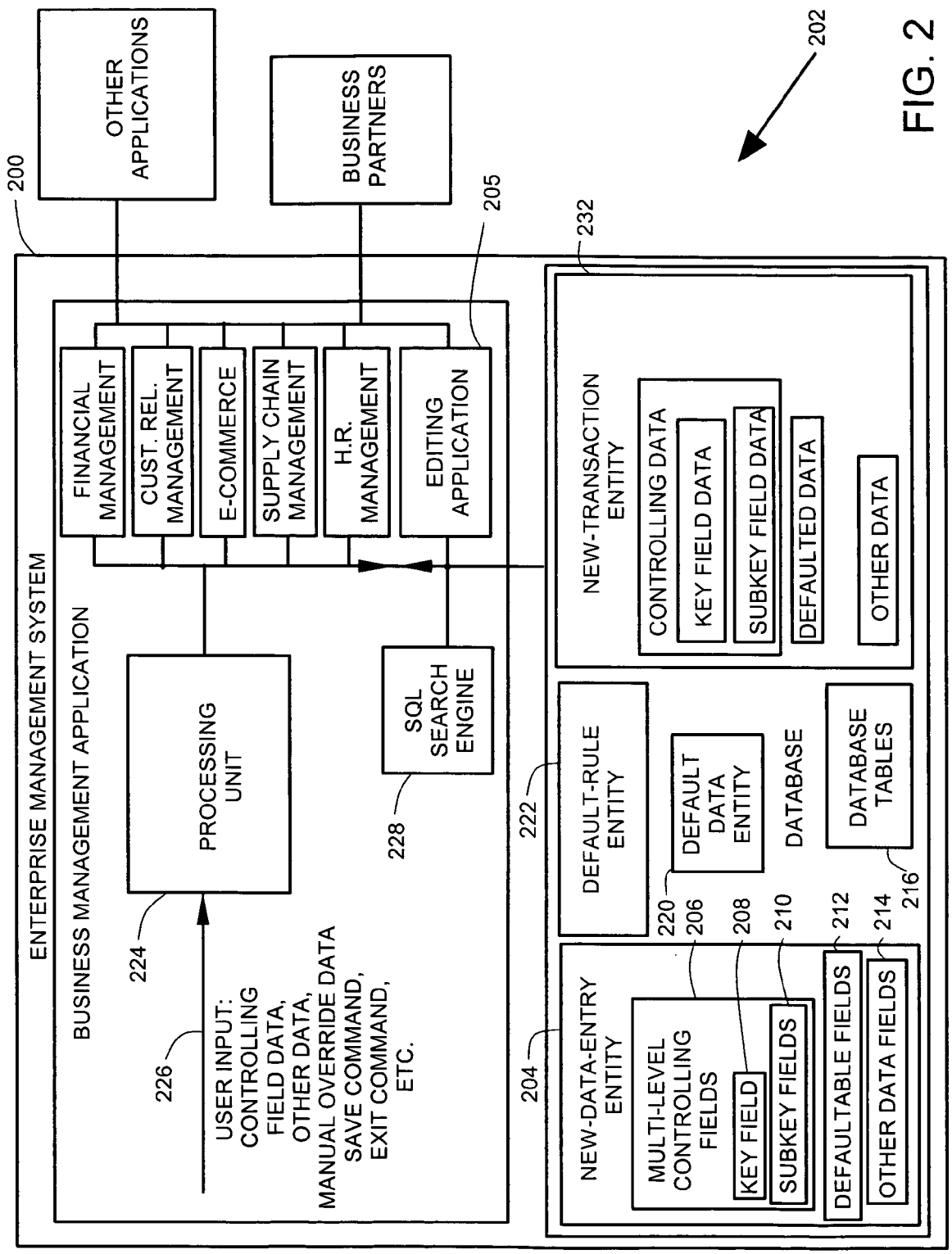
FIG. 2 illustrates an enterprise software package that combines database management applications and includes a system for entering transaction data.

FIG. 2 illustrates an enterprise software package 200 that combines financial management, customer relations management, supply chain management, human resource management or other database management applications in a single highly integrated enterprise application. The enterprise management software package 200 further comprises a system 202 for use in entering data into management database tables 216. The management database tables 216 include a large variety of types of data that are entered by the user and accessed by the various database management applications.

The system 202 comprises a new-data-entry entity 204. The new-data-entry entity 204 comprises a plurality of multilevel controlling fields 206 such as a key field 208 and subkey fields 210. The new-data-entry entity 204 further comprises a plurality of defaultable fields 212 and other data fields 214. The other data fields 214 are not defaultable and can receive manual data entries or measurements of various types.

The new-data-entry entity 204 is typically formatted using the same table formatting that is used for the management database tables 216. The new-data-entry entity 204 serves as a kind of "blank form" for entering data for a particular type of transaction. Typically, the user will use an editing application 205 to create and edit a customized new-data-entry entity 204 for each repetitive data entry task that is needed to support one of the management software applications. Typical new-data-entry entities can include order entry, entry of payments on accounts, entry of employee time, and the like. A selected new-data-entry entity 204 is usually opened for use in data entry by entering key data such as a customer number, an employee number, a supplier number or a similar number.

The system 202 comprises a default-data entity 220. The default-data entity 220 includes selectable default data available for automatic entry in the defaultable fields 212. The default-data entity 220 is typically formatted using the same table formatting that is used for the management database tables 216. The default-data entity 220 is typically a table of possible default data for one or more defaultable fields 212 in the new-data-entry entity 204. The default-data entity 220 can provide default data possibilities for a single defaultable field 212, or a single default-data entity 220 can provide all of the default data for a particular new-data-entry entity 204. An example of a default-data entity 220 is described below in connection with FIG. 5.

The system 202 comprises a default-rule entity 222. The default-rule entity 222 includes default rules that specify selections of the default data as a function of controlling data entered into the multilevel controlling fields 206. The default-rule entity 222 is typically formatted as a structured query language (SQL) query which is executed by a processing unit 224 in conjunction with an SQL search engine 228 that is part of the software package 200. The default-rule entity 222 can access one or more default-data entities 220, typically by pointing to one or more default-data keys in one or more default data tables such as described below in connection with FIG. 5.

The processing unit 224 receives controlling data entries 226 from a user for entry into the controlling fields 206. The processing unit 224 executes the data-default rules associated with the controlling data entries 226. The processing unit 224 automatically enters default data into the defaultable fields 212 as specified by the data-default rules. The data-default rules comprises multi-level correlations with the controlling data and can also comprise arithmetic computation as a function of the controlling data. The default data can be later replaced by manual override data from the user input 226. In some cases, one of the subkey controlling fields may also be a defaultable field when the particular subkey field can be calculated as a function of data that is already entered in other controlling fields. This ability for a field to be designated a controlling field in one rule, and for the same field to be designated a defaultable field in another rule enables the user to construct complex, multilevel hierarchies of defaults that minimize manual data entry and errors during data entry.

Upon receipt of a save command from a user, the processing unit 224 stores the data that was entered into the new-data-entry entity in a new-transaction entity 232. The processing system then clears the entered data from the new-data-entry entity 204 after the entered data is stored in the new-transaction entity 232. The new transaction entity 232 can be opened at a later time to make corrections before it is entered into a general ledger system. Typically after a batch of new-transaction entities are created and corrected as needed, the user provides a command to enter the batch, and the processing unit 224 distributes the stored data in the batch of new-transaction entities to the database files 216 associated with the new-transaction entities. The database files 216 typically comprise ledger files that are part of a general ledger database. The various features illustrated in FIG. 2 can be stored as series of computer executable instructions or as data structures on a computer-readable medium.

Figure 3:
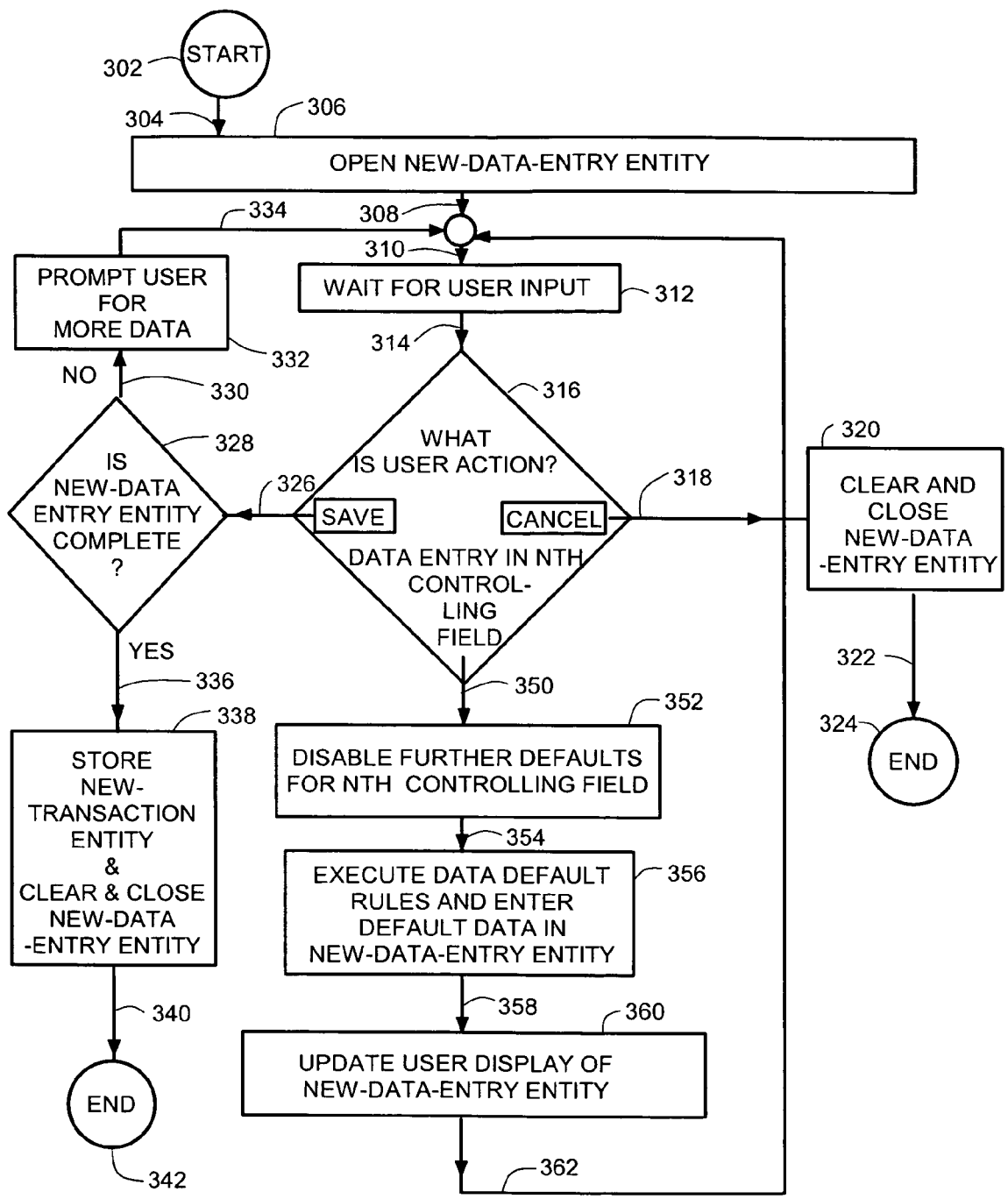
FIG. 3 illustrates a flow chart of a process that responds to user data entries in controlling fields by automatically entering default data in defaultable fields.

FIG. 3 illustrates a flow chart of process steps in a system which responds to a user entering data in controlling fields by automatically entering default data in defaultable fields. Processing starts at start 302 and continues along line 304 to action block 306.

At action block 306, a new-data-entry entity (such as entity 204 in FIG. 2) is opened and displayed on a user display. The new-data-entry entity can be displayed as a data table, a data entry screen, or in other known display formats. After completion of action block 306, processing continues along lines 308, 310 to action block 312. At action block 312, the processor waits for user input, and the processor can be performing other tasks in the background while waiting. When the user provides an input, processing continues along line 314 to decision block 316.

At decision block 316, if the user action is a decision to cancel the new data entry, then processing continues along line 318 to action block 320. At action block 320, the new-data-entry entity is cleared of all data and closed. After completion of action block 320, processing continues along line 322 to end 324.

At decision block 316, if the user action is a decision to save, then processing continues along line 326 to decision block 328. At decision block 328, the processor performs a validation routine that checks to confirm that all required fields in the new-data-entry entity are complete. If the new-data-entry entity is not complete at decision block 328, then processing continues along line 330 to action block 332. At action block 332, the processor prompts the user to provide missing required fields, and then processing continues along lines 334, 310 to action block 312.

At decision block 328, if the validation routine confirms that all required fields are completed, then processing continues along line 336 to action block 338. At action block 338, the data is stored in a new transaction entity (such as new transaction entity 232 in FIG. 2) and the new-data-entry entity is cleared and closed. After completion of action block 338, processing continues along line 340 to end 342.

At decision block 316, if the user has entered data in a controlling field (labeled here the Nth controlling field), then processing continues along line 350 to action block 352. At action block 352, the Nth field is disabled from any further defaulting. The action block 352 deals with a situation where a user "overrides" a defaultable field with a manual data entry.

After completion of action block 352, processing continues along line 354 to action block 356. At action block 356, the data default rules that are associated with the Nth data field are executed, and selected default data is entered into defaultable fields as specified by the default rules. Examples of execution of data default rules are described in more detail below in connection with FIGS. 4-6.

After completion of action block 356, processing continues along line 358 to action block 360. At action block 360, a user display of the new-data-entry entity is updated with the newly added default data from action block 356. After completion of action block 360, processing continues, looping back along lines 362, 310 to action block 312 to wait for the next user input.

The process illustrated in FIG. 3 can be stored as series of computer executable instructions on a computer-readable medium.

Figure 4:
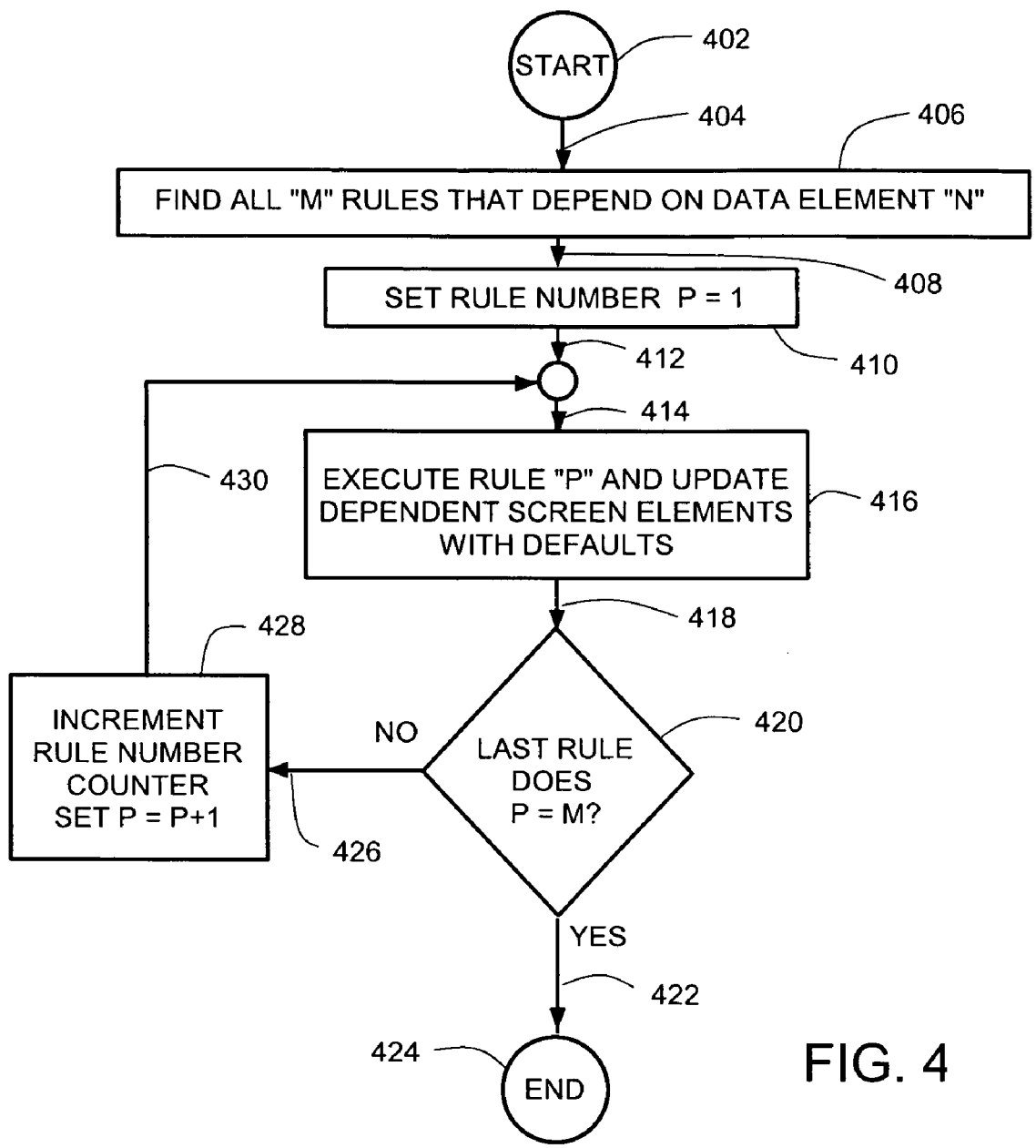
FIG. 4 illustrates a flow chart of execution of default rules in a default-rule entity.

FIG. 4 illustrates a process of execution of default rules in a default-rule entity such as default rule entity 222 in FIG. 2, or in action block 356 in FIG. 3. Processing begins at start 402 and continues along line 404 to action block 406. At action block 406, all of the 1 through M rules that depend on the most-recently entered Nth data element are found. At action block 406, the 1 through M data rules are preferably arranged hierarchically according to controlling field dependencies so that a rule that is affected by a result of execution of another rule is executed after that other rule is executed.

After completion of action block 406, processing continues along line 408 to action block 410. At action block 410, a software counter sets the current rule number P to 1 or, in other words, to the first rule.

After completion of action block 410, processing continues along lines 412, 414 to action block 416. At action block 416, the Pth rule is executed, which updates defaultable fields (and associated displays of screen elements) with default data specified by the Pth rule.

After completion of action block 416, processing continues along line 418 to decision block 420. At decision block 420 the processor tests whether the Pth rule is the last of the M rules to be executed. The rules executed in action block 416 access default data such as that illustrate in FIG. 5. If the last rule has been executed, then processing continues along line 422 to end 424. If the last rule has not be executed, then processing continues along line 426 to action block 428. At action block 428, the rule number counter is incremented by one, and processing continues along lines 430, 414 back to action block 416. The various features illustrated in FIG. 4 can be stored as series of computer executable instructions on a computer-readable medium.

FIG. 5 illustrates an example of a default-data entity 500. The default-data entity 500 has a file name 502 by which an associated default-rule entity can identify and access the default-data entity 500. The default-data entity 500 comprises table field definitions such as default-data key 504, defaultable field 506 and default data field 508. These table field definitions are established by a user during a setup mode using an editing application such as editing application 205 in FIG. 2.

Lines of data 510 . . . 522 are entered into the table (using editing application 205 shown in FIG. 2). Each line of data is identified by a key number in the default data key field 504. The key numbers are sequential and used to permit sequential access to identify the lines of data 510 in the default-data entity 500. Key numbers 510 . . . 512 identify default data for defaultable field 10005. Key numbers 514 . . . 516 identify default data for the defaultable field 10029. Key numbers 518 . . . 520 identify default data for defaultable field 10073. A rule in the new-data-entry entity points to a particular default data key number to identify the particular default data to be entered into a defaultable field as a result of execution of the rule. The various features illustrated in FIG. 5 can be stored as data structures on a computer-readable medium.

Figure 6:
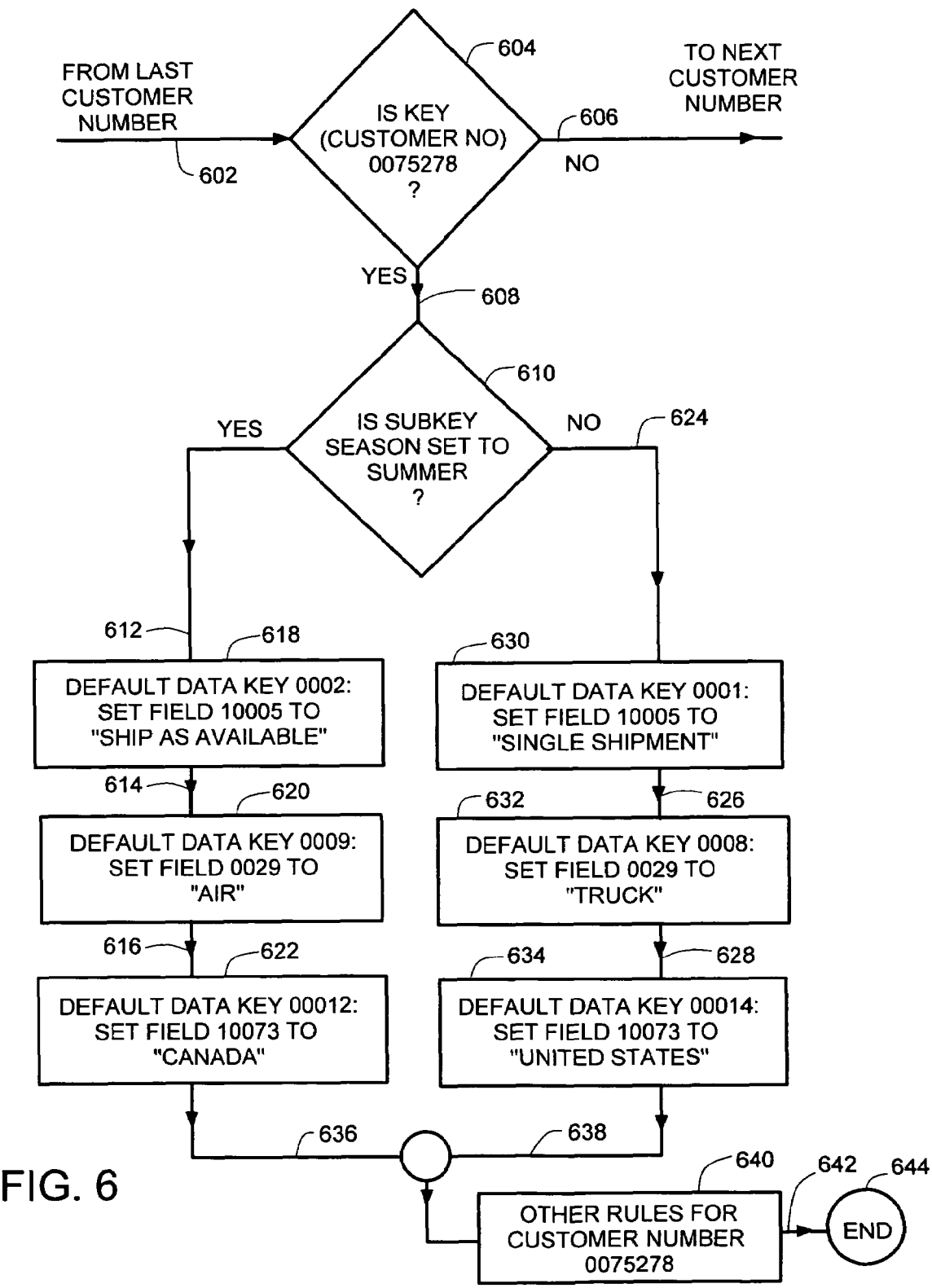
FIG. 6 illustrates a flow chart of execution of a rule that is part of a default-rule entity.

FIG. 6 illustrates an example of detailed execution of a rule that is part of a default-rule entity such as default rule entity 222 in FIG. 2. The example illustrated in FIG. 6 illustrates an example rule in which a customer number is the key, season is a subkey, and the rule sets default data for shipping instructions for the customer whose shipping requirements vary by season.

Processing starts along line 602, continuing from a previous comparison (not illustrated) of the key number entered by the user to another customer number that did not match). Processing continues along line 602 to decision block 604. At decision block 604, the key number entered is compared to customer number 0075278. If the key number and the customer number do not match at decision block 604, then processing continues along line 606 to another comparison (not illustrated) to another customer number which has associated default data. If the key number and the customer number do match at decision block 604, then processing continues along line 608, in order to execute default rules associated with customer number 0075278, to decision block 610.

At decision block 610, the processor tests whether the user has set a subkey "season" to "summer". If the subkey is set to summer at decision block 610, then processing continues along lines 612, 614, 616 to execute action blocks 618, 620, 622. Action blocks 618, 620, 622 automatically fill defaultable data fields with particular default data entries to indicate a default that the customer's order is to be shipped as available by air to the customer's address in Canada.

If the subkey is not set to summer at decision block 610, the processing continues along lines 624, 626, 628 to action blocks 630, 632, 634. Action blocks 630, 632, 634 automatically fill defaultable data fields with particular default data to indicate that the customer's order is to be shipped in a single shipment by truck to the customer's warehouse in the United States.

After completing execution of the rule on setting default data for shipping, execution continues (along lines 636 or 638) to action block 640. At action block 640, other rules associated with the customer number 0075278 are executed to provide other default data. For example, the defaultable field which received the default data entry of "Canada" or "United States" can also be a controlling field that can result in further address details being automatically entered in other defaultable fields. After completion of action block 640, processing continues along line 642 to end 644. The various features illustrated in FIG. 6 can be stored as series of computer executable instructions or as data structures on a computer-readable medium.

Although the present invention has been described with reference to particular embodiments, workers skilled in the art will recognize that changes may be made in form and detail without departing from the spirit and scope of the invention.

What is claimed is:

1. A computer-readable storage medium having computer executable instructions for performing steps comprising:
   providing a new-data-entry entity that includes key level and subkey level controlling database fields and a plurality of defaultable database fields;
   providing a default-data entity that includes selectable default data available for entry in the defaultable database fields;
   providing a default-rule entity that includes default rules that specify selections of the default data as a function of controlling data entered into the key level and subkey level controlling database fields;
   opening an instance of the new-data-entry entity;
   deciding, based on a user input, to clear and close the instance of the new-data-entry entity if the user input indicates a cancel command, to test if the instance of the new-data-entry entity is complete if the user input indicates a save command, and to disable further defaults for an Nth controlling field if the user input is a data entry in the Nth controlling field;
   receiving controlling data entries for the key level and subkey level controlling database fields;
   executing the data-default rules associated with the controlling data entries hierarchically according to dependencies on the key level and subkey level controlling database fields so that a rule that is affected by a result of execution of another rule is executed after that other rule is executed; and
   automatically entering default data into the defaultable database fields as specified by the data-default rules.

2. The computer-readable storage medium of claim 1, further comprising:
   storing the data entered into the new-data-entry entity in a new-transaction entity.

3. The computer-readable storage medium of claim 2, further comprising:
   clearing the entered data from the new-data-entry entity after the entered data is stored in the new-transaction entity.

4. The computer-readable storage medium of claim 2, further comprising:
   distributing the stored data to database files associated with the new-transaction entity.

5. The computer-readable storage medium of claim 4 wherein the database files comprise ledger files that are part of a general ledger database.

6. The computer-readable storage medium of claim 1 wherein the new-data-entry entity includes measurement database fields for which default data is not available.

7. The computer-readable storage medium of claim 1 wherein the data-default rule comprises an arithmetic computing as a function of the controlling data.

8. The computer-readable storage medium of claim 1 further comprising replacing the default data with manual Override data provided at a user input.

9. A computer-readable storage medium having stored thereon data comprising:
   a new-data-entry entity that includes key level and subkey level controlling database fields and a plurality of defaultable database fields;
   a default-data entity that includes selectable default data available for entry in the defaultable database fields;
   a default-rule entity that includes default rules that specify selections of the default data as a function of controlling data entered into the key level and subkey level controlling database fields;

data that opens an instance of the new-data-entry entity;

data that decides, based on a user input, to clear and close the instance of the new-data-entry entity if the user input indicates a cancel command, to test if the instance of the new-data-entry entity is complete if the user input indicates a save command, and to disable further defaults for an Nth controlling field if the user input is a data entry in the Nth controlling field; and executable instructions that enter data into a database as a function of the controlling database fields hierarchically according to dependencies on the key level and subkey level controlling database fields so that a rule that is affected by a result of execution of another rule is executed after that other rule is executed, default data and default rules.

10. The computer-readable storage medium of claim 9 further comprising a new-transaction entity that stores data entered in the new-data-entry entity.

11. The computer-readable storage medium of claim 9 wherein the new-data-entry entity includes measurement database fields for which default data is not available.

12. The computer-readable storage medium of claim 9 wherein the data-default rule comprises an arithmetic computation as a function of the controlling data.

13. A system for use in entering data into a database, comprising:

a new-data-entry entity that includes key level and subkey level controlling database fields and a plurality of defaultable database fields;

a default-data entity that includes selectable default data available for entry in the defaultable database fields;

a default-rule entity that includes default rules that specify selections of the default data as a function of controlling data entered into the key level and subkey level controlling database fields;

data that opens an instance of the new-data-entry entity;
data that decides, based on a user input, to clear and close the instance of the new-data-entry entity if the user input indicates a cancel command, to test if the instance of the new-data-entry entity is complete if the user input indicates a save command, and to disable further defaults for an Nth controlling field if the user input is a data entry in the Nth controlling field; and a processing unit that receives controlling data entries for the controlling database fields, that executes the data-default rules associated with the controlling data entries, and that automatically enters default data into the defaultable database fields as specified by the data-default rules, hierarchically according to dependencies on the key level and subkey level controlling database fields so that a rule that is affected by a result of execution of another rule is executed after that other rule is executed.

14. The system of claim 13 wherein the processing system stores the data entered into the new-data-entry entity in a new-transaction entity.

15. The system of claim 14 wherein the processing system clears the entered data from the new-data-entry entity after the entered data is stored in the new-transaction entity.

16. The system of claim 14 wherein the processing system distributes the stored data to database files associated with the new-transaction entity.

17. The system of claim 16 wherein the database files comprise ledger files that are part of a general ledger database.

18. The computer-readable storage medium of claim 1 wherein the executing of the data-default rules comprises:
(a) finding a set of rules that depend on data in the Nth controlling field for the instance of the new-data-entry entity; and
(b) executing one rule in the set of rules under control of a rule number counter;
(c) testing whether all rules in the set of rules has been executed, and if all rules in the set of rules have not been executed, then incrementing the rule number counter and returning to step (b) to execute a next rule in the set of rules, and if all of the rules in the set of rules have been executed, then updating a user display of the instance of the new-data-entry entity.

19. The computer-readable storage medium of claim 9 further comprising:
(a) first data finding a set of rules that depend on data in the Nth controlling field for the instance of the new-data-entry entity; and
(b) second data executing one rule in the set of rules under control of a rule number counter;
(c) third data testing whether all rules in the set of rules has been executed, and if all rules in the set of rules have not been executed, then incrementing the rule number counter and returning to step (b) to execute a next rule in the set of rules, and if all of the rules in the set of rules have been executed, then updating a user display of the instance of the new-data-entry entity.

20. The system of claim 13 further comprising:
(a) first data finding a set of rules that depend on data in the Nth controlling field for the instance of the new-data-entry entity; and
(b) second data executing one rule in the set of rules under control of a rule number counter;
(c) third data testing whether all rules in the set of rules has been executed, and if all rules in the set of rules have not been executed, then incrementing the rule number counter and returning to step (b) to execute a next rule in the set of rules, and if all of the rules in the set of rules have been executed, then updating a user display of the instance of the new-data-entry entity.

* * * * *